Figures 1, 2:
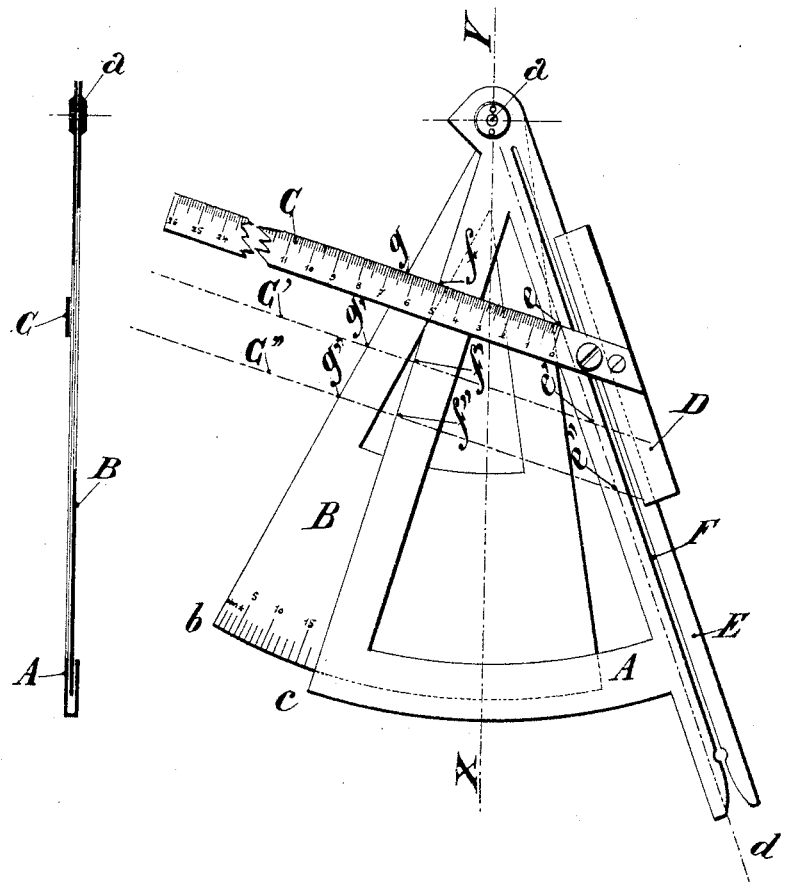

No. 790,431. PATENTED MAY 23, 1905.
E. HAYEM.
CALCULATING APPARATUS.
APPLICATION FILED JAN. 2, 1903.

Witnesses
Ellis Owen

Inventor.
E. Hayem
by W. Edwards
Attorney.

No. 790,431.

Patented May 23, 1905.

UNITED STATES PATENT OFFICE.

EMILE HAYEM, OF PARIS, FRANCE.

CALCULATING APPARATUS.

SPECIFICATION forming part of Letters Patent No. 790,431, dated May 23, 1905.

Application filed January 2, 1903. Serial No. 137,589.

*To all whom it may concern:*

Be it known that I, EMILE HAYEM, a citizen of the French Republic, residing at 38 Rue du Sentier, Paris, France, have invented certain new and useful Improvements in and Relating to Calculating Apparatus, of which the following is a specification.

This invention relates to an apparatus serving for the calculation of prime cost, sale price, and percentage and capable of being utilized in a more general fashion for solving calculations based upon the rule of three and proportion.

An apparatus provided according to the invention is illustrated in the accompanying drawings, in which—

Figure 1 is a front elevation, and Fig. 2 a sectional side elevation thereof.

The apparatus is constituted of the following essential elements:

First. A fixed sector A, disposed in such manner that one of its angular edges $a\,c$ forms with an imaginary line $a\,d$ parallel with its second angular edge a certain fixed angle.

Second. A second sector B, forming an angle of which the apex $a$ coincides with the apex of the angle $c\,a\,d$ of the first sector. The second sector B pivots under the first upon the same apex $a$, which is situated upon a slight prolongation of the edge of the second sector B.

Third. A graduated rule C disposed in such manner as to transversely cut the first angular edge $c\,a$ of the angle $c\,a\,d$. This rule may be mounted at its extremity upon a relatively long slide D, which can be displaced along the length of a slot E, which is parallel to the imaginary line $a\,d$, before referred to, the slot E of the slide D being so provided that the rule C is maintained substantially parallel in all positions which it occupies. The said rule C is graduated upon one of its sides with any suitable graduations of measures uniformly spaced apart.

A circular series of graduations is provided upon the angular edge of the base part of the sector B, which graduations correspond to the opening of the angle $b\,a\,c$, formed by the front edge of the second sector with that of the first.

The apparatus is employed by the adjustment of the rule C along the imaginary line $a\,d$ aforesaid and by the partial rotary displacement of the second sector B in relation to the first.

By the employment of this apparatus one obtains by direct reading the one of three following particulars, the other two being known—that is, prime cost, sale price, percentage of profit. This reading is made on the basis of the following indications: In all positions of the elements the part $e\,f$ of the graduated rule C between the imaginary line $a\,d$ aforesaid and the point $f$ on the front edge $c\,a$ of the first sector A represents the measure of prime cost. The part $f\,g$ of the graduated rule C between the point $f$ upon the front edge $c\,a$ of the first sector A and the point $g$ on the front edge of the second sector B represents the profit, from which it results that the scale from $e$ to $g$—that is, from the imaginary line $a\,d$ aforesaid to the point of intersection of the front edge $b\,a$ of the second sector B with the edge of the graduated rule—represents the sale price, while the indication in the circular scale $b\,c$ upon the second sector B indicates the percentage of profit. For attaining this result the circular graduations $b\,c$ of the sector B could be determined by calculation or more simply by the successive application of the apparatus for operations in which the three elements are known. For example, for the determination of the division ten corresponding to the percentage ten one would have to give the elements a position corresponding to this, for example: sale price, ten; cost price, nine. One would then bring the rule C to slide so as to place the division nine upon the line $a\,c$. Then in causing the sector B to pivot under the sector A the division ten of the rule C would be brought upon the line $a\,b$. The division ten would have to be marked upon the graduation of the sector B, and in the same way other percentages would be determined.

The second sector B could be mounted with a graduation representing multiplicators and quotients.

The parallelism of the rule may be assured in any particular manner. For example, a slot E in the rear angular edge of the first sector A could be provided parallel with the imaginary line *a d* aforesaid in which a part of the rule-slide D may pass which has the same section as that of the said groove.

The apparatus may be made of any suitable material, such as paper, wood, or metal.

The various measures employed may be varied according to the purpose for which the apparatus is employed.

It will be understood that the theory of the apparatus is essentially based upon the proportionality of the corresponding sides of similar triangles formed in different positions, which is determined by the different positions of the sectors and the movable rule. This theory shows clearly that the apparatus can be utilized in a general fashion by one or a number of successive readings for all calculations based upon the rule of three and proportions while the apparatus can be equally utilized for effecting multiplications and divisions.

What I claim as my invention, and desire to secure by Letters Patent, is—

1. A calculating apparatus consisting of a frame, a sector pivoting on said frame, graduations upon the peripheral edge of the said sector, and the straight edge on said frame for registering the graduations on the sector, and a graduated rule sliding upon said frame and traversing the straight edge of the frame and the straight edge of the sector, substantially as described.

2. A calculating apparatus consisting of a frame, a sector pivoting on said frame, graduations upon the peripheral edge of the said sector and the straight edge on said frame for registering the graduations on the sector, and a graduated rule sliding upon said frame and traversing the straight edge of the frame and the straight edge of the sector, a slot in said frame, said slot carrying a slide, the said graduated rule secured to said slide, and traversing across the straight edge of the frame and of the sector, substantially as described.

3. A calculating apparatus consisting of two sectors one pivoting on the other and having graduations on its peripheral edge to register with a straight edge upon the other, and a slot near the edge of one of the sectors opposite to that upon which the straight edge is provided, a slide within said slot and a graduated scale carried by said slide, substantially as described.

In testimony whereof I have signed my name to this specification in the presence of two subscribing witnesses.

EMILE HAYEM.

Witnesses:
 EDWARD P. MACLEAN,
 HENRI BLOUIN.